United States Patent
Kingdon et al.

(10) Patent No.: US 10,007,440 B2
(45) Date of Patent: Jun. 26, 2018

(54) METHOD OF REORDERING A QUEUE OF WRITE REQUESTS

(71) Applicant: Cisco Technology, Inc., San Jose, CA (US)

(72) Inventors: Kevin Wayne Kingdon, Hayward, CA (US); Ryan Michael Okelberry, Provo, UT (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 168 days.

(21) Appl. No.: 15/208,277

(22) Filed: Jul. 12, 2016

(65) Prior Publication Data

US 2017/0147229 A1    May 25, 2017

Related U.S. Application Data

(60) Provisional application No. 62/258,504, filed on Nov. 22, 2015.

(51) Int. Cl.
*G06F 12/00* (2006.01)
*G06F 3/06* (2006.01)

(52) U.S. Cl.
CPC .......... *G06F 3/0611* (2013.01); *G06F 3/0629* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 9,286,106 | B1* | 3/2016 | Huang | G06F 9/4881 |
| 2009/0055829 | A1* | 2/2009 | Gibson | G06F 9/4881 |
| | | | | 718/103 |
| 2010/0269116 | A1* | 10/2010 | Potkonjak | G06F 9/4887 |
| | | | | 718/103 |
| 2013/0191841 | A1* | 7/2013 | Gibson | G06F 9/4881 |
| | | | | 718/104 |
| 2015/0293836 | A1* | 10/2015 | Cheng | G06F 9/45558 |
| | | | | 718/1 |
| 2016/0085587 | A1* | 3/2016 | Dube | G06F 9/5011 |
| | | | | 718/104 |
| 2016/0156715 | A1* | 6/2016 | Larouche | H04L 67/1097 |
| | | | | 709/201 |
| 2017/0038481 | A1* | 2/2017 | Cheng | G01T 1/2002 |
| 2017/0123853 | A1* | 5/2017 | Chandra | G06F 9/5016 |
| 2017/0255490 | A1* | 9/2017 | Aberg | G06F 9/505 |

* cited by examiner

*Primary Examiner* — John A Lane
(74) *Attorney, Agent, or Firm* — Ronald Fernando

(57) ABSTRACT

In some implementations, a method includes, at a latency reduction system configured to reduce latency in writing data to one or more storage entities that are each configured to store data on an object-basis, receiving a scheduling request associated with a write operation. The method also includes determining a wait period for the write operation, where the wait period is less than or equal to the difference between a client-defined operation threshold and an operation completion time of the write operation and determining an operation start time for the write operation, based in part on the wait period.

20 Claims, 10 Drawing Sheets

METHOD OF REORDERING A QUEUE OF WRITE REQUESTS

TECHNICAL FIELD

The present disclosure relates generally to storage systems, and in particular, to enabling more efficient scheduling of write operations of various sizes.

BACKGROUND

In previously available storage systems data mirroring has been used to provide fault tolerance. With data mirroring, multiple copies of an object are stored on a vault disk (or other storage mediums) and again on different disks, so that an individual disk failure damages or results in the loss of merely one copy of the data. A downside of data mirroring is that it relies on significantly increasing memory utilization for each degree of fault tolerance. For example, in order to provide resilience for one disk failure, twice as much disk space is utilized. In order to provide resilience for two disk failures, three times the disk space is utilized. Another problem with data mirroring is that it would result in a policy conflict for recording various media programs, by cable and other media delivery service providers. Specifically, when recording a program on behalf of a customer, the Digital Millennium Copyright Act (DMCA) enacted on Oct. 28, 1998, provides that one and only one unique instance of the data may be created for the customer. In this context, data mirroring for the sake of providing fault tolerance violates copyright and associated fair use restrictions.

Additionally, implementation of modern large-scale data storage techniques is preferred, to allow for fast, reliable writing of large volumes of fault-tolerant data. Write operations requested by a client have a time limit for completion. However, in some instances the data set associated with a request for a write operation is very large, and the write operation cannot be completed within a time limit for completion if several smaller write operations are received and scheduled by a storage system in advance of the larger data set.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1A:
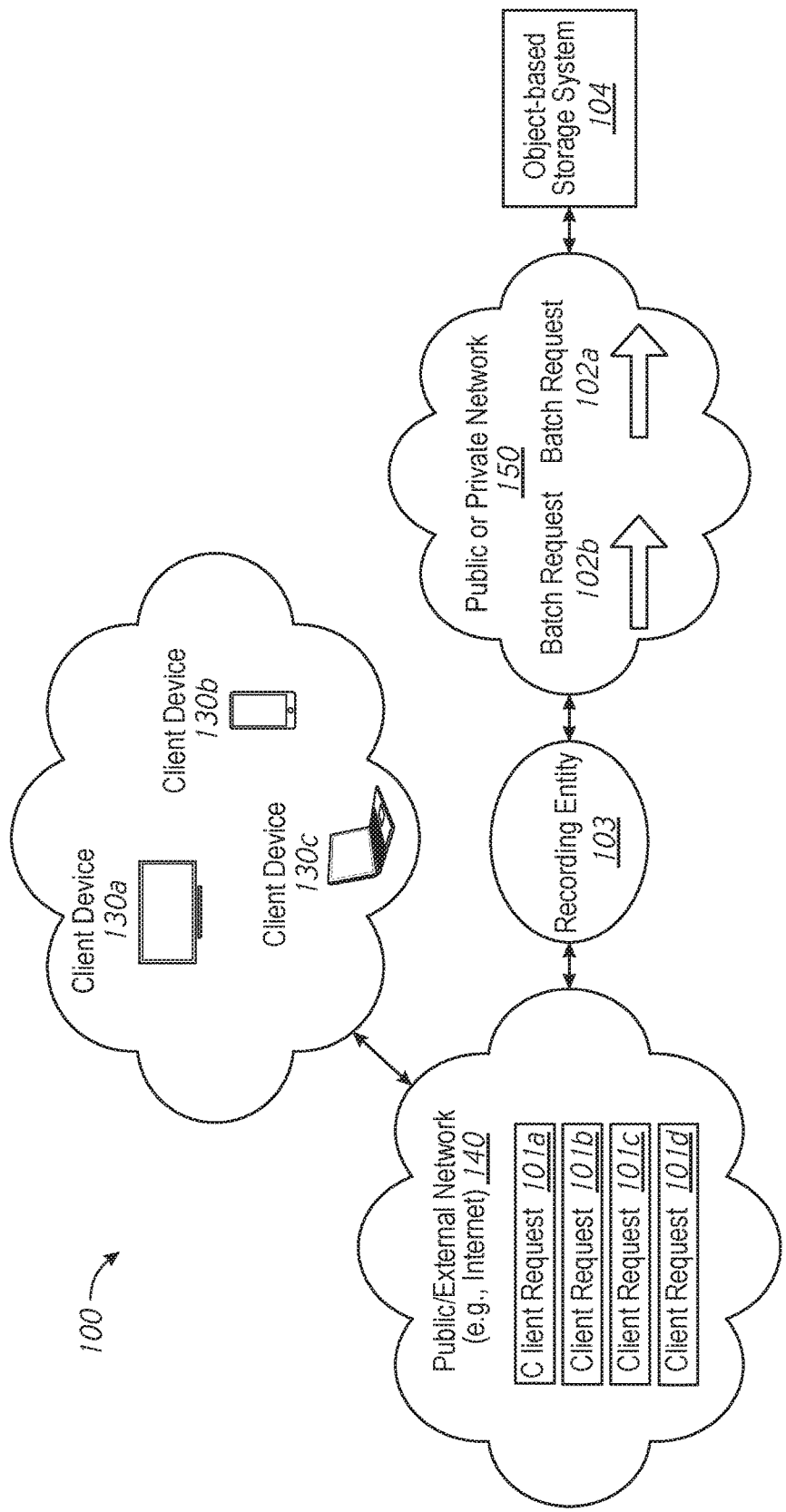
FIG. 1A is a block diagram of a storage environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Write operations requested by a client device of an enterprise storage system typically have a time limit for completion. However, in typical operating circumstances the size of data sets associated with multiple client requests varies unpredictably, and as such the order in which write requests for various data sizes arrives is also unpredictable. In turn, using previously available scheduling systems that simply rely on first-in-first out processing, a write operation for a large data set may not be completed within a (quality-of-service defining) time limit for completion if several smaller write operations are received and scheduled by the storage system in advance of the larger data set.

By contrast, various implementations disclosed herein include apparatuses, systems, and methods for reordering write operations in a queue of a storage entity. For example, in some implementations, a method includes, at a latency reduction system configured to reduce latency of writing data to one or more storage entities that are each configured to store data on an object-basis, receiving a scheduling request associated with a write operation. The method also includes determining a wait period for the write operation, where the wait period is less than or equal to the difference between a client-defined operation threshold and an operation completion time of the write operation and determining an operation start time for the write operation, based in part on the wait period.

Example Embodiments

Figure 1B:
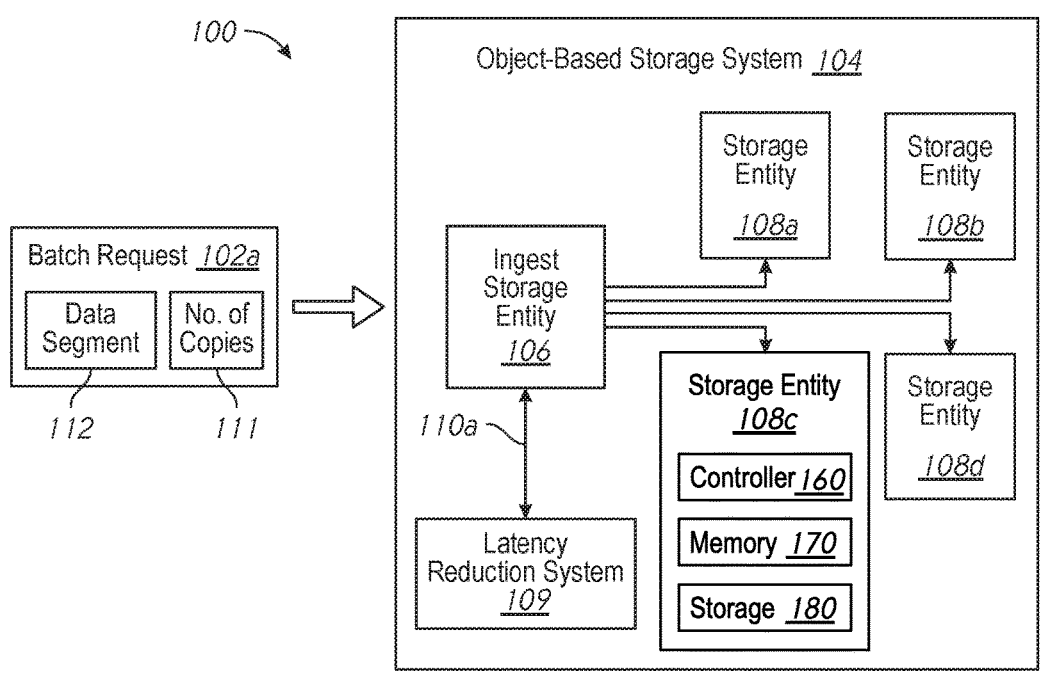
FIG. 1B is a block diagram of a storage environment in accordance with some implementations.

FIGS. 1A and 1B are block diagrams of a storage environment 100 in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, in some implementations, the storage environment 100 includes client devices, such as televisions 130a, smart phones 130b and laptops 130c. In some implementations, storage environment 100 includes client devices not shown, such as set-top boxes, video game consoles, tablets, computers, and any other electronic devices configured to obtain and convey audiovisual media information. FIG. 1A illustrates that one or more client devices are connected to a public or external network 140 (e.g., the Internet). In some embodiments, a respective client device, such as client device 130a, is connected to public or external network 140 to transmit one or more read/write requests, such as client requests 101a, 101b, 101c and 101d, to a recording entity 103 and/or to object-based storage system 104 without first being transmitted to recording entity 103.

In some implementations, storage environment 100 is configured to store audio/visual data associated with multicast (e.g., broadcast) content and acts as a digital video recorder (DVR). As both data and read/write requests can be received over a network, the storage system 100 can function as a cloud-based DVR. To that end, in some embodiments, a respective client request, such as client request 101a, includes information identifying a portion of a media item, such as a data segment. In some implementations, a client device transmits several client requests in succession, to enable storage of a desired portion of a media item. For example, one client request corresponds to two seconds of data for a news program that client device 130a requests to be recorded. In this example, client device 130a sends nine hundred successive client requests through public network 140 to recording entity 103, to record half an hour of the news program.

FIG. 1A also illustrates that in some implementations, storage environment 100 includes a recording entity 103 connected by a public or private network 150 to an object-based storage system 104. In some implementations, recording entity 103 receives one or more client requests and generates one or more batch requests. For example, the laptop 130c, sends a client request through network 150 to recording entity 103, to record a portion of a particular media item. In some implementations, recording entity 103 is managed or operated by an entity that provides multimedia content to end users, such as a cable television provider, an online-streaming platform and/or a satellite programming provider. In some implementations, recording entity 103 aggregates one or more client requests into batch requests. For example, recording entity 103 receives one hundred client requests within a predefined batching time period from one hundred distinct client devices, to record the same two seconds of a particular media item, and translates those one hundred client requests into a single batch request for storage at object-based storage system 104.

In some implementations, there is a many-to-one relationship between client requests and batch requests, such that many client requests are aggregated or packaged into a single batch request. In some implementations, there is a one-to-one relationship between client requests and batch requests. For instance, if only one received client request corresponds to recording a particular media item within the predefined batching time period, recording entity 103 creates a batch request with the single client request. In some implementations, storage environment 100 does not include recording entity 103, and client requests are received by object-based storage system 104. In some implementations, recording entity 103 is a part of object-based storage system 104.

FIG. 1B illustrates a portion of storage environment 100, the object-based storage system 104 that receives batch requests corresponding to client requests. In some implementations, object-based storage system 104 is configured to primarily store data in one or more storage entities such as storage entity 106 or 108a, on an object-basis, rather than on another basis such as a file-basis. In some implementations, object-based storage system 104 receives stand-alone client requests, or packaged as batch requests, as described above with respect to FIG. 1A. In some implementations, a batch request, such as batch request 102a, includes information such as a data segment 112 and a number of copies 111 to make of the data segment 112. For example, data segment 112 is two seconds of data corresponding to a particular basketball game, and number of copies 111 indicates that five hundred copies of data segment 112 are to be stored in the storage space of object-based storage system 104, for five hundred client devices.

FIG. 1B illustrates an example of components found in object-based storage system 104. In some implementations, object-based storage system 104 includes one or more storage entities, such as servers, storage disks, and other computing devices, which work together to store information corresponding to a client request or batch request received by the object-based storage system 104. In some implementations, a respective storage entity of object-based storage system 104 stores data and/or back-up data, and in some implementations any storage entity can be further defined as an ingest storage entity 106. In some implementations, storage entities such as storage entities 108a, 108b, 108c and 108d, are referred to as peer storage entities with respect to ingest storage entity 106. FIG. 1B illustrates that one or more storage entities, such as storage entity 108c, include components such as a controller 160, memory 170 (e.g., RAM), and storage space 180 (e.g., non-volatile memory). In some implementations, controller 160 for a respective storage entity has control links to every other storage entity of object-based storage system 104. While storage entity 108c is shown to include components such as controller 160, memory 170 and storage 180, it will be understood by one of ordinary skill in the art that any storage entity of object-based storage system 104 has one or more of these components or other components not shown.

In some implementations, an ingest storage entity 106 of object-based storage system 104, receives and/or transmits data, an instruction or any type of communication from outside object-based storage system 104, such as a client request or a batch request. In some implementations, ingest storage entity 106 also receives and/or transmits various communications within object-based storage system 104, such as write operations to storage entities such as storage entities 108a, 108b, 108c and 108d, and scheduling requests to latency reduction system 109. In some implementations, a respective storage entity, is defined as an ingest storage entity 106 for a respective batch request, and is not necessarily defined as an ingest storage entity 106 for all received batch requests. For example, a server identified as Server B of an object-based storage system 104, receives a batch request 102b corresponding to various client requests to record an episode of a cooking show. In this example, Server B is an ingest storage entity 106, with respect to that batch request 102b. In this example, a server identified as Server G of the object-based storage system 104, is defined as an ingest storage entity 106 for a subsequent batch request 102c. In some implementations, an ingest storage entity 106 is also involved in the storage and/or retrieval of data associated with a request received by the ingest storage entity 106, or received by another storage entity, such as storage entity 108a, of object-based storage system 104. For example, in FIG. 1B, ingest storage entity 106 receives batch request 102a, and subsequently stores parity data corresponding to data segment 112 of batch request 102a.

In some implementations, object-based storage system 104 mitigates the risk of losing stored data segments 112, by distributing the storage of the requested copies of data segments 112 among various storage entities. In some implementations, object-based storage system 104 also generates and distributes storage of parity data corresponding to the data segments 112 associated with respective batch requests. For example, a batch request 102d corresponds to storage of four hundred copies of a data segment 112 of a particular talk show. In this example, one hundred copies of data segment 112 are stored at a server of object-based storage system 104 identified as Server E, one hundred copies are stored at Server H, one hundred copies are stored at Server A and one hundred copies are stored at Server J. In this same example, parity data corresponding to data segment 112 of batch request 102d is stored at Server C, and parity data corresponding to data segment 112 of batch request 102d is stored at Server K. This example illustrates an object-based storage system 104 configured to store and distribute data and corresponding parity data, for a given batch request, across four data-storing storage entities and two parity-storing storage entities. In some implementations, a respective object-based storage system 104 is configured with a data-to-parity storage ratio. The data-to-parity storage ratio determines how many storage entities will store content data (e.g., copies of data segment 112) corresponding to a batch request, and how many storage entities will store parity information corresponding to the same batch request. In some implementations, a data-to-parity storage ratio is configurable, allowing for conservation of storage space or an increased degree of data protection.

In some implementations, multiple write operations within object-based storage system 104 correspond to one batch request or client request received by an ingest storage entity 106. For example, if the data-to-parity storage ratio for object-based storage system 104 is three data-storing storage entities to two parity-storing storage entities, there are five write operations corresponding to batch request.

In some implementations, as shown in FIG. 1B, object-based storage system 104 includes a latency reduction system 109. In some implementations, latency reduction system 109 is a server, storage entity, and/or scheduling entity, which receives scheduling requests from various ingest storage entities 106 of the object-based storage system 104. FIG. 1B illustrates that latency reduction system 109 has a control link 110a to ingest storage entity 106. In some implementations, latency reduction system 109 has multiple control links, such as control link 110a, used to maintain communication and allow for data transfer between latency reduction system 109 and the various storage entities such as storage entities 106, 108a, 108b, 108c and 108d.

One role of latency reduction system 109 is to schedule write operations for the work queues of storage entities such as storage entities 106, 108a, 108b, 108c and 108d of object-based storage system 104. As described above, ingest storage entity 106 of FIG. 1B, receives client requests and/or batch requests from a source external to the object-based storage system 104, such as a client device or recording entity 103. In some implementations, latency reduction system 109 receives one or more scheduling requests from one or more ingest storage entities 106, where a respective scheduling request corresponds to a respective client request and/or a respective batch request. For example, ingest storage entity 106 receives a batch request to store three hundred copies of data segment 112 at object-based storage system 104. In this example, ingest storage entity 106 sends a scheduling request over control link 110a to latency reduction system 109, to determine when one or more write operations corresponding to the batch request, should take place at one or more storage entities of system 104. In this example, if there is a data-to-parity storage ratio of three data-storing storage entities to two parity-storing storage entities, ingest storage entity 106 sends a scheduling request to obtain operation start times for five write operations.

In some implementations, latency reduction system 109 uses a write operation threshold to determine when a respective write operation should be scheduled for commencement at a respective storage entity. The write operation threshold is a predefined period of time to complete a respective write operation, and/or all write operations for a respective batch request. For example, a write operation threshold for object-based storage system 104 is 700 ms. In this example, the data associated with a batch request, such as data segment 112 of batch request 102a, must be completely written to storage entities of object-based storage system 104 in 700 ms. In some implementations the write operation threshold is defined by a client, such as an operator of recording entity 103 or an individual client device 130, and is referred to as a client-defined operation threshold. In some implementations, the write operation threshold is predefined by latency reduction system 109 or object-based storage system 104, and is a portion of a larger task completion window defined by an entity external to object-based storage system 104. For example, a media provider associated with recording entity 103 specifies that copies of a data segment 112 are to be written into object-based storage system 104, and acknowledgment of the writing to be received within 1 sec, therefore object-based storage system 104 defines the write operation threshold to be 700 ms to provide for some margin of error.

In some implementations, latency reduction system 109 determines the size of a respective write operation, to determine the start time or degree of priority for that write operation. For example, a batch request arrives at ingest storage entity 106 to write 300 copies of a 1 MB file, and ingest storage entity 106 sends a corresponding scheduling request to latency reduction system 109. In this example, the object-based storage system 104 stores content data (e.g., actual data) corresponding to a batch request, across three storage entities and parity data corresponding to the batch request across two storage entities of the object-based storage system 104. Latency reduction system 109 determines that three write operations of content data of 100 MB each and two write operations of parity data of 100 MB each, will be executed to store and back up the data of the scheduling request. In this example, latency reduction system 109 determines that at a rate of 1 Gb/s, it will take 100 ms to write 100 MB of content or parity data. In this example, if a write operation threshold for the object-based storage system 104 is 700 ms, latency reduction system 109 can allow for a 600 ms wait time before scheduling a write operation for 100 MB of content or parity data.

In some implementations, latency reduction system 109 determines which storage entities of object-based storage system 104 will store data or parity data corresponding to a batch request. In some implementations, latency reduction system 109 bases this determination on the data-to-parity storage ratio and one or more performance factors, such as the CPU load of a respective storage entity, its available disk space and number of tasks in the queue of a respective storage entity. In some implementations, latency reduction system 109 returns write operation scheduling information to ingest storage entity 106, including which storage entities will store corresponding content data or corresponding parity data for batch request 102a. Latency reduction system 109 also includes a respective operation start time for each write operation so a respective storage entity of the selected storage entities can appropriately queue incoming write operations from various storage entities acting as an ingest storage entity.

While FIG. 1B illustrates five storage entities in object-based storage system 104, those of ordinary skill in the art will appreciate from the present disclosure that various other combinations of storage entities, servers and/or computing devices in object-based storage system 104 have not been illustrated for the sake of brevity. Each of the depicted entities 106, 109, 108a, 108b, 108c and 108d of object-based storage system 104 can be implemented on the same or separate computing devices. In some implementations, object-based storage system 104 can be a distributed object store including multiple computing devices networked over multiple locations.

Figure 2A:
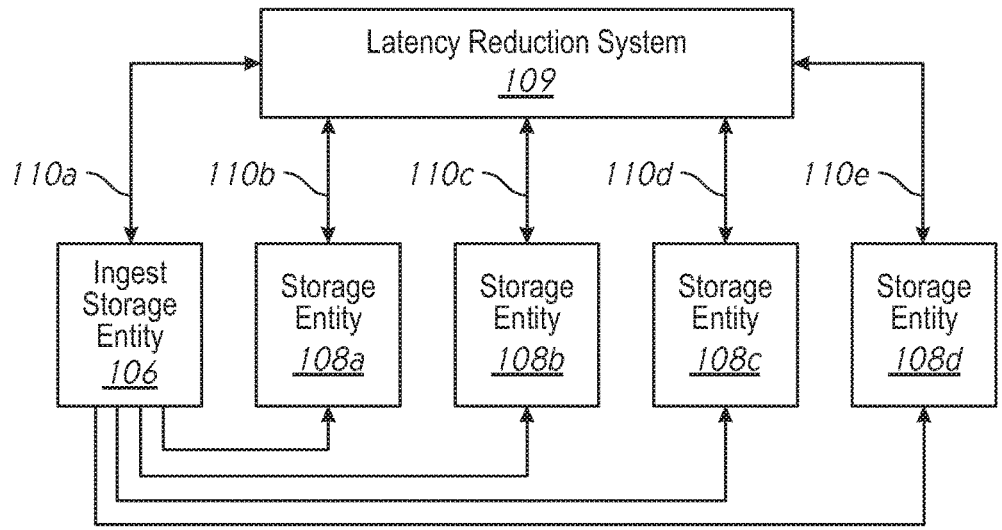
FIG. 2A is a block diagram illustrating control links between a latency reduction system and storage entities in accordance with some implementations.

FIG. 2A is a block diagram illustrating control links 110 between latency reduction system 109 and storage entities 106 and 108 in accordance with some implementations. In some implementations, there is one latency reduction system 109 for all the storage entities of a particular object-based storage system, and latency reduction system 109 has control links such as control links 110a, 110b, 110c, 110d and 110e to each of the storage entities of the object-based storage system, such as storage entities 106, 108a, 108b, 108c and 108d, respectively. In some implementations there is more than one latency reduction system 109 for all the storage entities of a particular object-based storage system, and a particular latency reduction system 109 only has control links to a subset of all the storage entities.

Figure 2B:
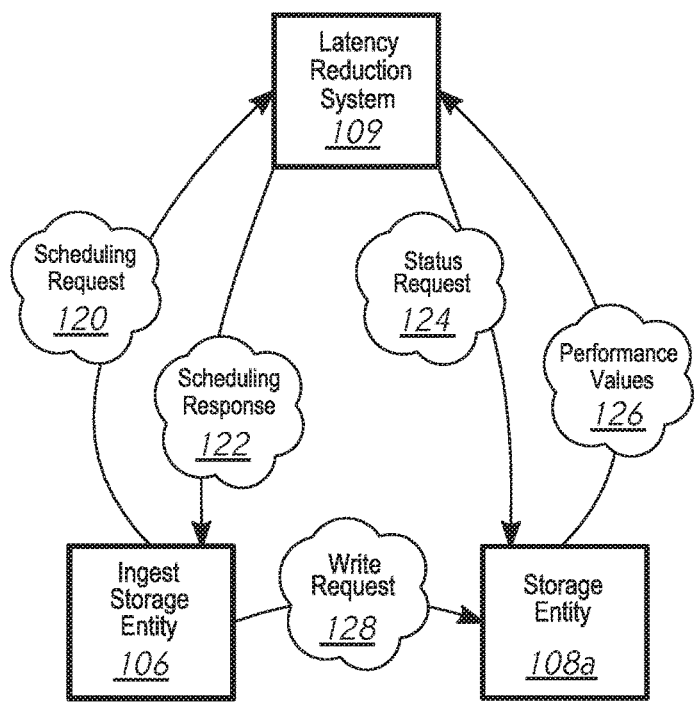
FIG. 2B is a block diagram representation of example communications among components of an object-based storage system in accordance with some implementations.

FIG. 2B illustrates some example communications among components of an object-based storage system in accordance with some implementations. As described above, in some implementations, ingest storage entity 106 sends a scheduling request 120 to latency reduction system 109. In some implementations the scheduling request includes one or more of a data segment, a location for retrieving the data segment, a size of the data segment, a copy count of the data segment, the client-defined operation threshold and a data-to-parity ratio for storage and backup in the one or more storage entities.

FIG. 2B also illustrates that in some implementations, in response to receiving scheduling request 120 from ingest storage entity 106, latency reduction system 109 generates and transmits scheduling response 122 to ingest entity 106. In this example, scheduling response 122 corresponds to scheduling request 120, where scheduling response 122 provides operation start times for one or more write operations, as requested in scheduling request 120. FIG. 2B also illustrates example communications between latency reduction system 109 and storage entities such as storage entity 108a. For example, latency reduction system 109 sends a status request 124 to storage entity 108a, to determine information such as the free storage space, the CPU load, the existing work queue and/or any other performance-related factors at storage entity 108a. In this example, storage entity 108a generates performance values 126 in response to receiving status request 124 and transmits the corresponding performance values 126 to latency reduction system 109.

As shown in FIG. 2B, ingest storage entity 106 receives a scheduling response message 122, which it uses to generate write request 128, which has a respective operation start time for a write operation to be performed at storage entity 108a. In some implementations, scheduling response 122 identifies how many storage entities store data or parity data corresponding to scheduling request 120 and its associated batch request or client request. In some implementations, scheduling response 122 also identifies specific storage entities to store data or parity data corresponding to scheduling request 120, and each write operation start time for each write request 128. In some implementations, scheduling response 122 corresponds to the write operations associated with storing and backing-up data from a client request or batch request received by ingest storage entity 106. For example, if there is a data-to-parity storage ratio of 3:2 storage entities in the object-based storage system, scheduling response 122 includes write operation start times for five separate write operations to be performed at five separate storage entities. In some implementations, scheduling response 122 corresponds to a single write operation.

Figure 3A:
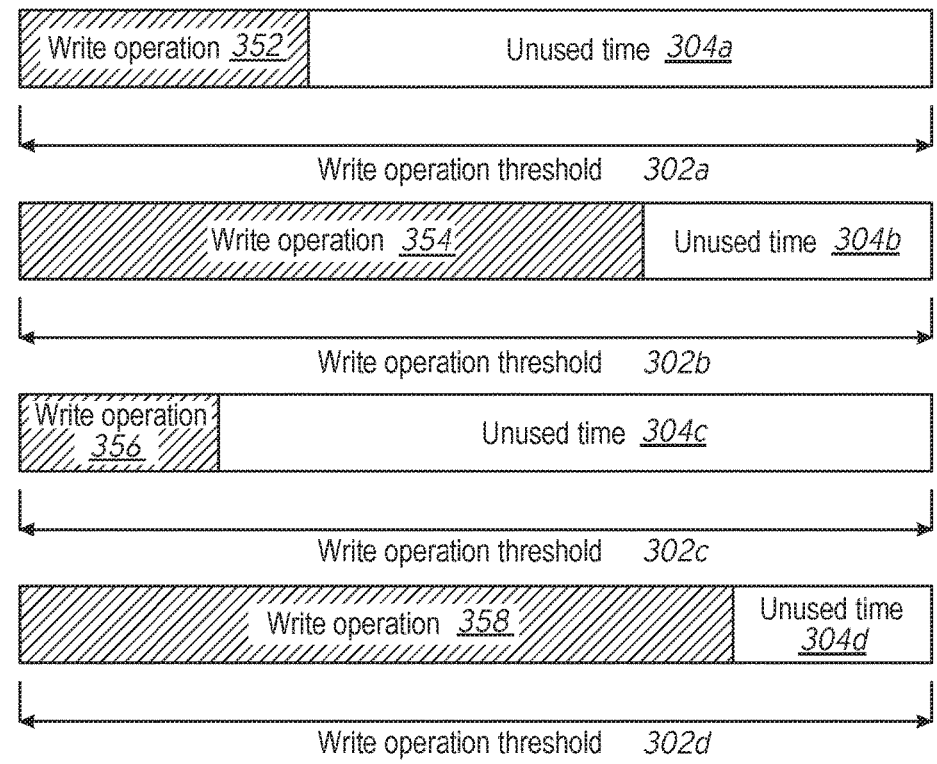
FIG. 3A is a block diagram representation of a First-In, First-Out (FIFO) approach to scheduling write operations at a particular storage entity in accordance with some implementations.
Figure 3B:
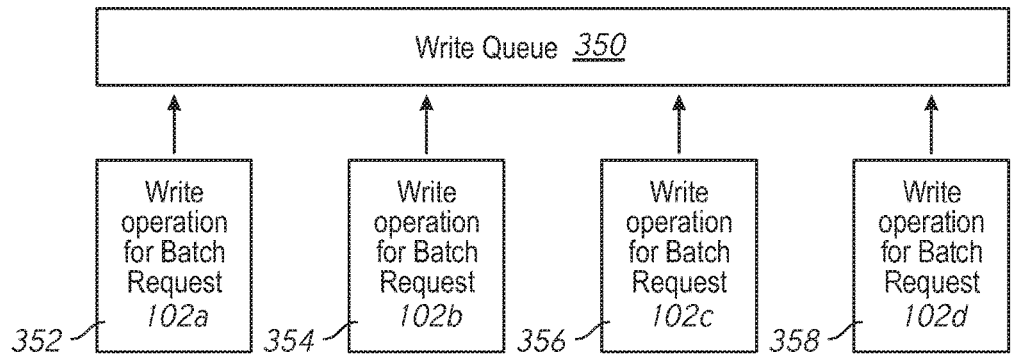
FIG. 3B is a block diagram representation of a write queue using the FIFO approach, at a storage entity in accordance with some implementations.

FIG. 3A illustrates a First-In, First-Out (FIFO) approach to scheduling write operations at a particular storage entity (e.g., storage entity 108a, FIG. 1B) in accordance with some implementations. FIG. 3B illustrates a write queue 350, at the same respective storage entity of FIG. 3A in accordance with some implementations. In FIG. 3A, four examples are shown of time periods for writing data corresponding to four batch requests received in chronological order at an object-based storage system. As can be seen in the examples of FIGS. 3A and 3B, a write operation 358 (e.g., corresponding to batch request 102d) will take the longest duration of time to complete, while a write operation 356 (e.g., corresponding to batch request 102c) will take the shortest duration of time to complete. In the examples of FIG. 3A, the write operation threshold 302 (e.g., threshold 302a, 302b, 302c and 302d) for each write operation, has the same duration, but one of ordinary skill in the art will appreciate that in some implementations, these thresholds are variable in duration among write operations. FIG. 3A illustrates that for a respective write operation corresponding to a respective batch request, there is some unused time 304 (e.g., unused time 304a, 304b, 304c and 304d) remaining in the write operation threshold 302. Unused time 304d, in particular, illustrates that for large write operations such as write operation 358, there is a small window of time for ensuring that a large write operation gets completed within its respective write operation threshold 302.

In FIG. 3B, write operations 352, 354, 356 and 358 corresponding to various batch requests received by the object-based storage system, are ordered in a FIFO arrangement. In some implementations, this FIFO arrangement will result in some write operations not being completed within their respective write operation thresholds. For example, a write operation 358 corresponding to batch request 102d, takes 600 ms to complete, leaving 100 ms of unused time 304d in a write operation threshold 302d of 700 ms. However, if the storage entity assigned to perform write operation 358 of the previous example has a long queue of other operations ahead of write operation 358, the additional processing time delays the start time of write operation 358, potentially causing it to finish beyond its write operation threshold 302d.

Figure 4A:
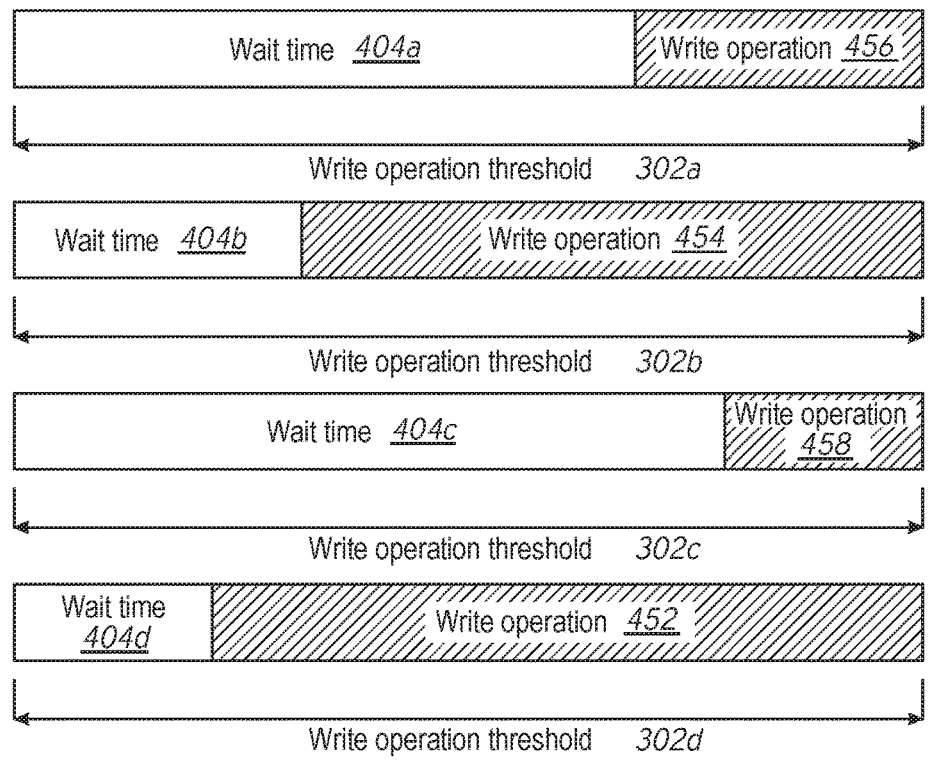
FIG. 4A is a block diagram representation of an alternative technique to FIFO, for scheduling write operations at a respective storage entity in accordance with some implementations.
Figure 4B:
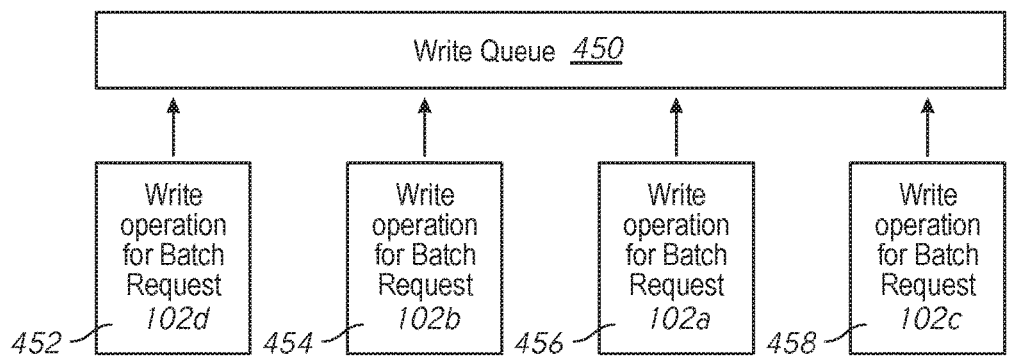
FIG. 4B is a block diagram representation of a write queue for an alternative scheduling technique from the FIFO approach in accordance with some implementations.

FIG. 4A illustrates an alternative technique to FIFO, for scheduling write operations at a respective storage entity in accordance with some implementations. FIG. 4B illustrates a write queue 450 for the alternative scheduling technique, in accordance with some implementations. This technique considers the duration of a respective write operation, and a point in time when the respective write operation must start, in order to be completely finished before the end of its write operation threshold. For example, FIGS. 4A and 4B illustrate write operations 456, 454, 458 and 452 corresponding to batch requests 102a, 102b, 102c and 102d respectively, which were received in chronological order. In this example, respective write operations are compared on the basis of preferred start time. For example, write operation 456 (e.g., corresponding to batch request 102a) will take 250 ms to complete, therefore, in a write operation threshold of 700 ms, a wait time 404a of up to 450 ms can be tolerated before this write operation must start. In some implementations, this determined operation start time is translated into a specific temporal value (e.g., machine clock time in ms).

In FIG. 4B, write operation 452 corresponding to batch request 102d (having the longest duration) is performed first, followed by write operation 454 corresponding to batch request 102b, followed by write operation 456 corresponding to batch request 102a, and finally write operation 458 corresponding to batch request 102c (having the shortest duration). In this approach, some write operations will take longer to be performed than they would in the FIFO approach (e.g., write operations 458 corresponding to batch request 102c), however, this approach also allows write operation 452 to start much earlier, and likely be completed within its associated write operation threshold. The scheduling approach illustrated by FIGS. 4A and 4B strives to reduce the number of write operations that are not completed within their respective write operation thresholds. This results in slowing down the completion time of shorter duration write operations, and speeding up the completion time of longer duration write operations, resulting in a much more even and predictable rate for overall write operation completion time.

Figure 5A:
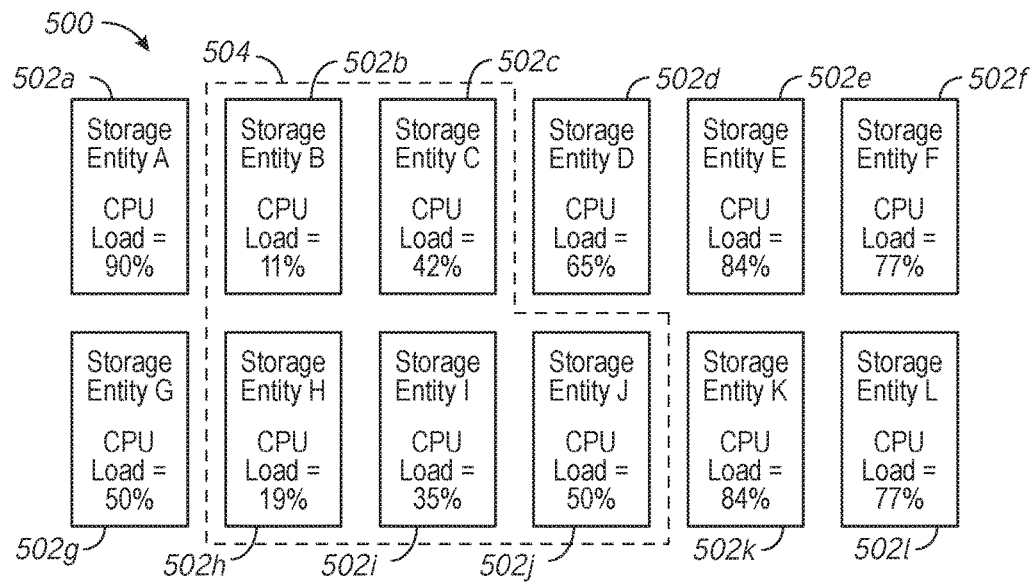
FIG. 5A is a block diagram representation of a selection process of a set of storage entities for receiving write operations corresponding to a particular scheduling request in accordance with some implementations.

FIG. 5A illustrates a selection process of a set 504 of storage entities for receiving write operations corresponding to a particular scheduling request in accordance with some implementations. The set 504 of storage entities is selected from an example cluster 500 of storage entities, storage entity A 502a, storage entity B 502b, storage entity C 502c, storage entity D 502d, storage entity E 502e, storage entity F 502f, storage entity G 502g, storage entity H 502h, storage entity I 502i, storage entity J 502j, storage entity K 502k and storage entity L 502l. In some implementations, a basis for selecting set 504 of the storage entities corresponding to a respective scheduling request, is the CPU load for each storage entity. For example, a scheduling request is associated with three data-storing storage entities and two parity-storing storage entities. In this example, a set 504 of five storage entities of cluster 500, with the lowest CPU load at the time, are selected.

Figure 5B:
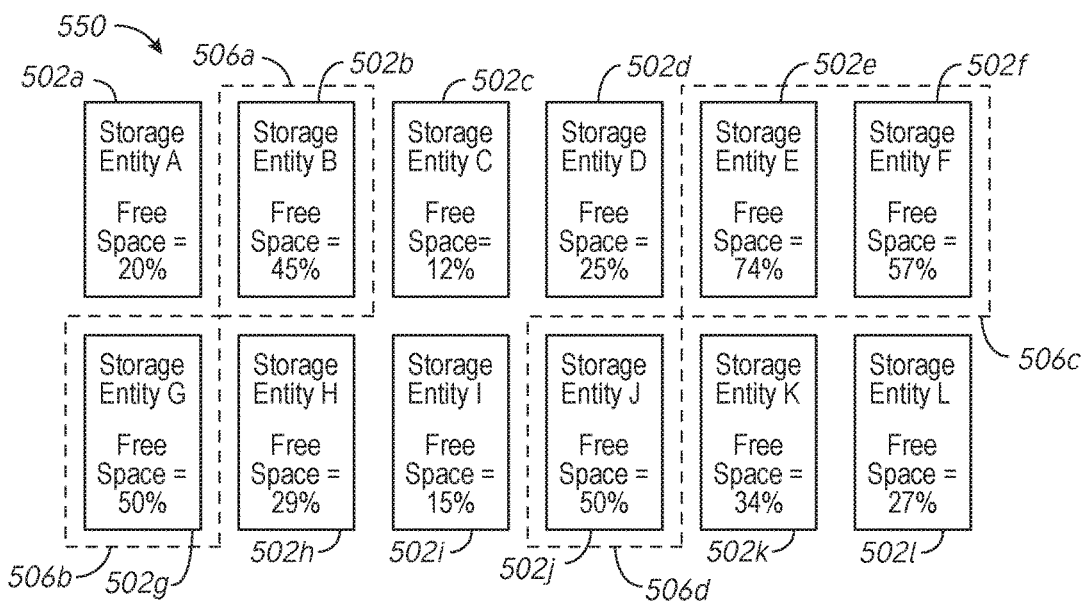
FIG. 5B is a block diagram representation of another selection process of a set of storage entities for receiving write operations corresponding to a particular scheduling request in accordance with some implementations.

FIG. 5B illustrates another selection process of a set comprising sets 506a, 506b and 506c, of storage entities for receiving write operations corresponding to a particular scheduling request in accordance with some implementations. In some implementations, a basis for selecting a set of storage entities for performing write operations corresponding to a respective scheduling request, is the available free storage space for each storage entity. For example, Storage Entity B 502b, Storage Entity E 502e, Storage Entity F 502f, Storage Entity G 502g and Storage Entity J 502j are selected because they are the five storage entities that have the highest available free storage space. In some implementations, when two or more storage entities have the same value for the primary set-selection criteria (e.g., the same CPU load or same availability of storage space), a secondary set-selection criteria is used to select a storage entity among the two or more storage entities.

Figure 6:
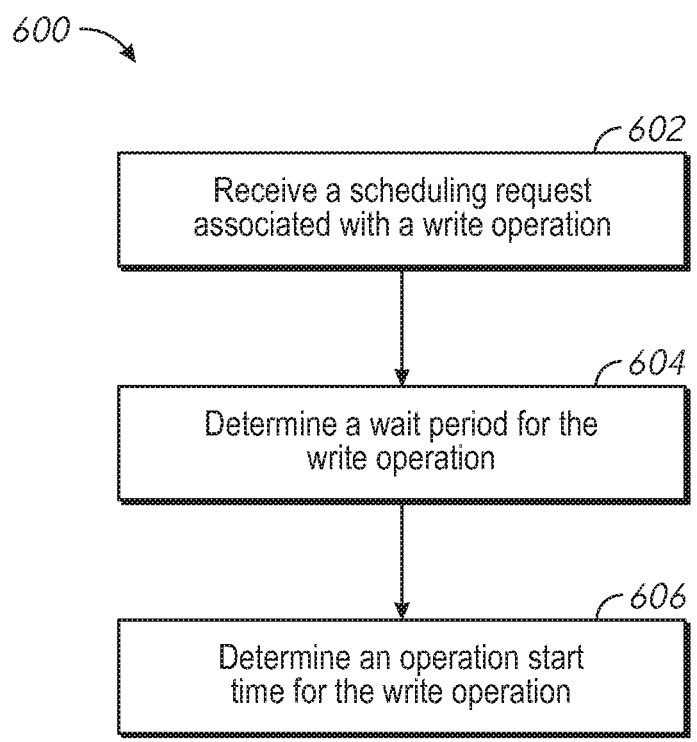
FIG. 6 is a flowchart representation of a method of scheduling write operations in an object-based storage system, in accordance with some implementations.

FIG. 6 is a flowchart representation of a method 600 of scheduling write operations in an object-based storage system, in accordance with some implementations. In some implementations and as detailed below as an example, the method 600 is performed by a computing device of the object-based storage system, such as a latency reduction system 109 of FIG. 1B. In some implementations, the method 600 is performed by processing logic, including hardware, firmware, software, or a combination thereof. In some implementations, the method 600 is performed by a processor executing code stored in a non-transitory computer-readable medium (e.g., a memory). Briefly, the method 600 includes receiving a scheduling request and generating a set of scheduled write operations corresponding to the scheduling request.

Method 600 includes receiving (602) a scheduling request associated with one or more write operations. In some implementations, the one or more write operations are associated with a batch request. For example, in FIG. 1B, latency reduction system 109 receives a scheduling request from ingest storage entity 106 to schedule writing data corresponding to batch request 102a across storage entities within object-based storage system 104. In some implementations, a latency reduction system 109 is a storage entity among the storage entities involved in the storage of data and/or parity data corresponding to the received scheduling request. In some implementations the scheduling request includes one or more of a data segment, a location for retrieving the data segment, a size of the data segment, a copy count of the data segment, the client-defined operation threshold and a data-to-parity ratio for storage and backup in the one or more storage entities.

The method 600 includes determining (604) a wait period for at least one of the write operations. For example, in FIG. 4A, a wait time 404d is determined corresponding to a write time for a write operation 452 corresponding to batch request 102d. Method 600 includes determining (606) an operation start time for each of the one or more write operations. For example, in FIG. 4B, write operation 452 is placed first in write queue 450, relative to the other write operations, because it has been given an earlier operation start time than the others.

Figure 7A:
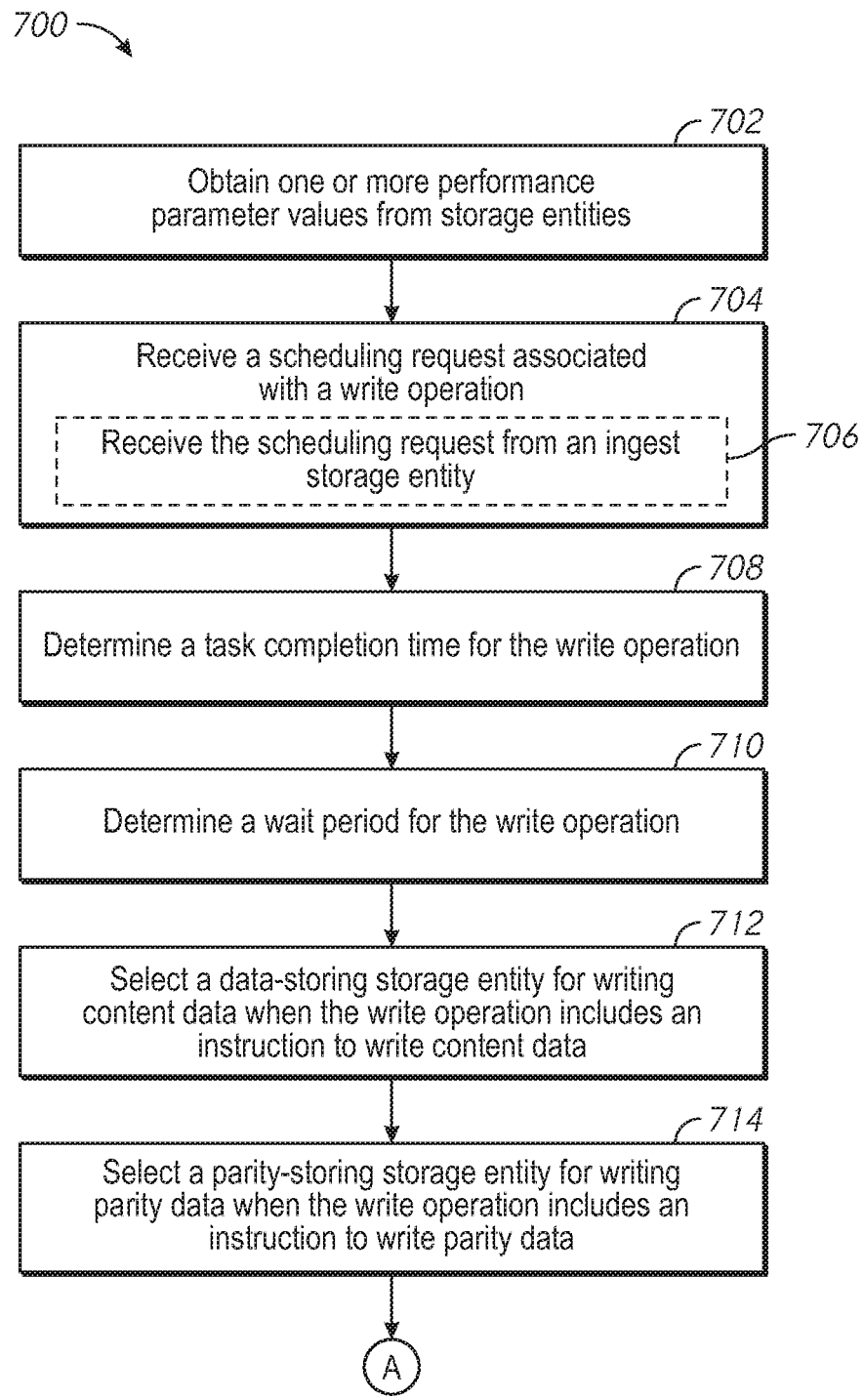
FIGS. 7A-7B are a flowchart representation of a method of scheduling write operations in an object-based storage system, in accordance with some implementations.
Figure 7B:
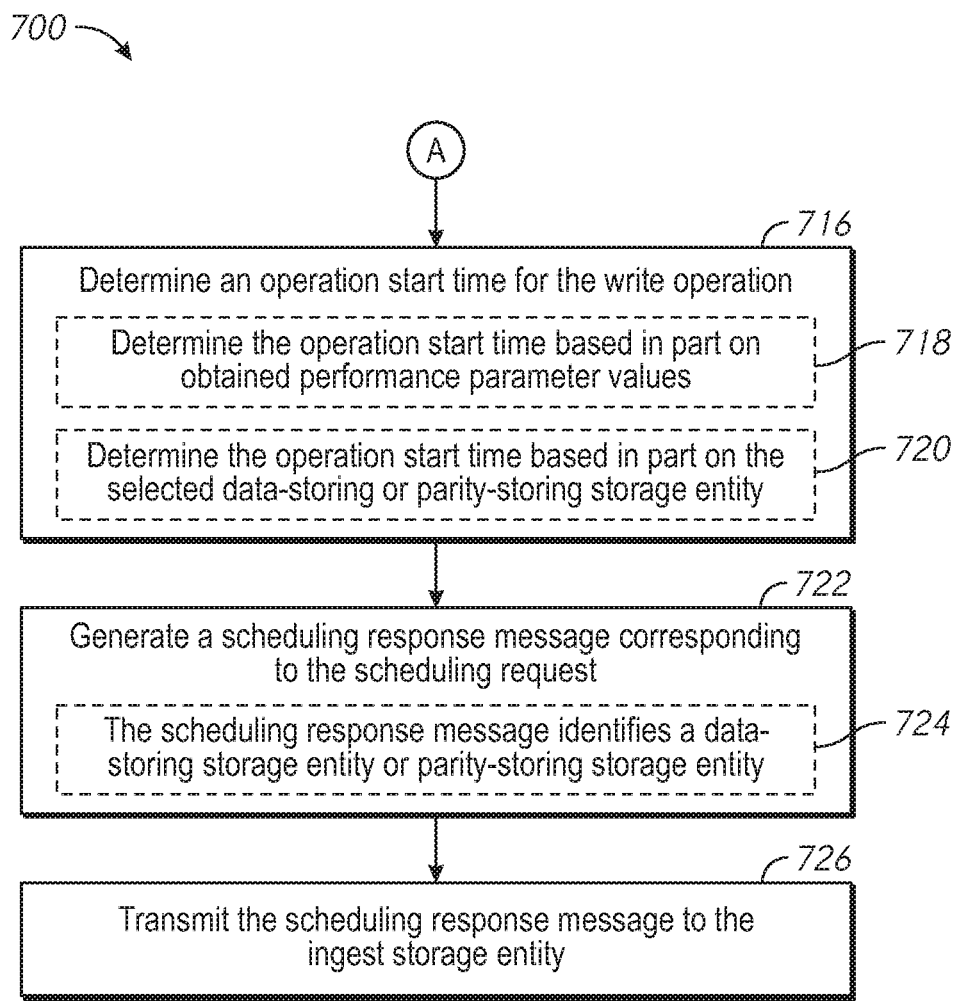

FIGS. 7A and 7B are a flowchart representation of a method 700 of scheduling write operations in an object-based storage system, in accordance with some implementations. In some implementations and as detailed below as an example, the method 700 is performed by a computing device of the object-based storage system, such as a latency reduction system 109 of FIG. 1B. In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, the method 700 includes receiving a scheduling request and generating a set of scheduled write operations corresponding to the scheduling request.

Method 700 includes obtaining (702) one or more performance parameter values from storage entities. For example, FIG. 2B illustrates latency reduction system 109 sending a status request 124 to storage entity 108a, and receiving performance values 126, comprising values for one or more performance parameters of storage entity 108a, such as CPU load and free storage space. In some implementations, the latency reduction system 109 obtains one or more performance parameter values from all the storage entities of the object-based storage system that it is connected to with control links. In some implementations, the one or more performance parameter values are obtained on a periodic basis.

Method 700 includes receiving (704) a scheduling request associated with a write operation, as described above with respect to method 600 of FIG. 6. In some implementations, the scheduling request is received (706) from an ingest storage entity. For example, as shown in FIG. 2B, scheduling request 120 is received by latency reduction system 109 from ingest storage entity 106.

After receiving the scheduling request associated with a write operation, method 700 includes determining (708) a task completion time for the write operation. For example, FIG. 4A illustrates a task completion time for write operation 456, within write operation threshold 302a. In some implementations, the task completion time of the write operation is determined using the size of the write operation and an average write speed of storage entities of an object-based storage system. In some implementations, the latency reduction system determines the size of the write operation for a storage entity, by determining how many copies of a given data segment, or how many copies of parity data of a data segment are to be stored at the storage entity. For example, in an object-based storage system with a data-to-parity storage ratio of three data-storing storage entities to two parity-storing storage entities, and a received batch request to store three hundred copies of a data segment, one hundred copies of the data segment are to be stored at a respective storage entity.

Method 700 includes determining (710) a wait period for the write operation. For example, as shown in FIG. 4A, wait time 404a is determined for write operation 456. In some implementations, a wait period is determined for a respective write operation by subtracting the determined task completion time of the write operation from a write operation threshold. In some implementations, a write operation threshold is further defined as a client-defined operation threshold, and is established by a recording entity or a client device.

Method 700 includes selecting (712) a data-storing storage entity for writing content data when the write operation includes an instruction to write data, and selecting (714) a parity-storing storage entity for writing parity data when the write operation includes an instruction to write parity data. For example, a scheduling request, associated with a single batch request or client request, is received by a latency reduction system configured with a data-to-parity storage ratio of 3:2. In this example, the single batch request or client request is associated with five write operations, namely three write operations to write content data (e.g., copies of a data segment), and two write operations to write parity data corresponding to the content data. In this example, the latency reduction system selects three storage entities to store content data (e.g., data-storing storage entities) corresponding to the three write operations to write content data. Additionally, the latency reduction system selects two storage entities to store content parity data (e.g., parity-storing storage entities) corresponding to the two write operations to write parity data. In some implementations, a latency reduction system selects one or more data-storing storage entities and one or more parity-storing storage entities, on the basis of the obtained performance parameter values, as described above with respect to FIGS. 5A and 5B. For example, since there is an additional computational demand to generate parity data from content data, the latency reduction system selects the two parity-storing storage entities with the lowest CPU loads of a cluster of available storage entities within the object-based storage system.

Method 700 includes determining (716) an operation start time for the write operation, as described above with respect to FIG. 4B. In some implementations, determining (718) a respective operation start time is based in part on obtained performance parameter values. In some implementations, determining (720) a respective operation start time is based in part on the selected data-storing or parity-storing storage entity. For example, after selecting three storage entities of the object-based storage system for storing content data associated with a received scheduling request, a respective write operation is assigned to each of those three (data-storing) storage entities. In this example, one respective write operation has its task completion time, wait time and operation start time determined or adjusted, by factoring in performance parameter values of the storage entity assigned to perform the one respective write operation.

Method 700 includes generating (722) a scheduling response message corresponding to the scheduling request. For example, as shown in FIG. 2B, latency reduction system 109 generated scheduling response 122, corresponding to scheduling request 120. In some implementations, the scheduling response message includes write operation scheduling information, such as write operation start times for one or more write operations associated with the scheduling request. In some implementations, the scheduling response message identifies (724) one or more data-storing storage entities and one or more parity-storing storage entities. For example, the scheduling response message identifies five write operation start times for five distinct write operations to be performed at five distinct storage entities. In this example, three of the identified storage entities are assigned to store content data corresponding to the scheduling request, and two of the identified storage entities are assigned to store parity data corresponding to the scheduling request. Method 700 includes transmitting (726) the scheduling response message to the ingest storage entity, as described above with respect to FIG. 2B.

Figure 8:
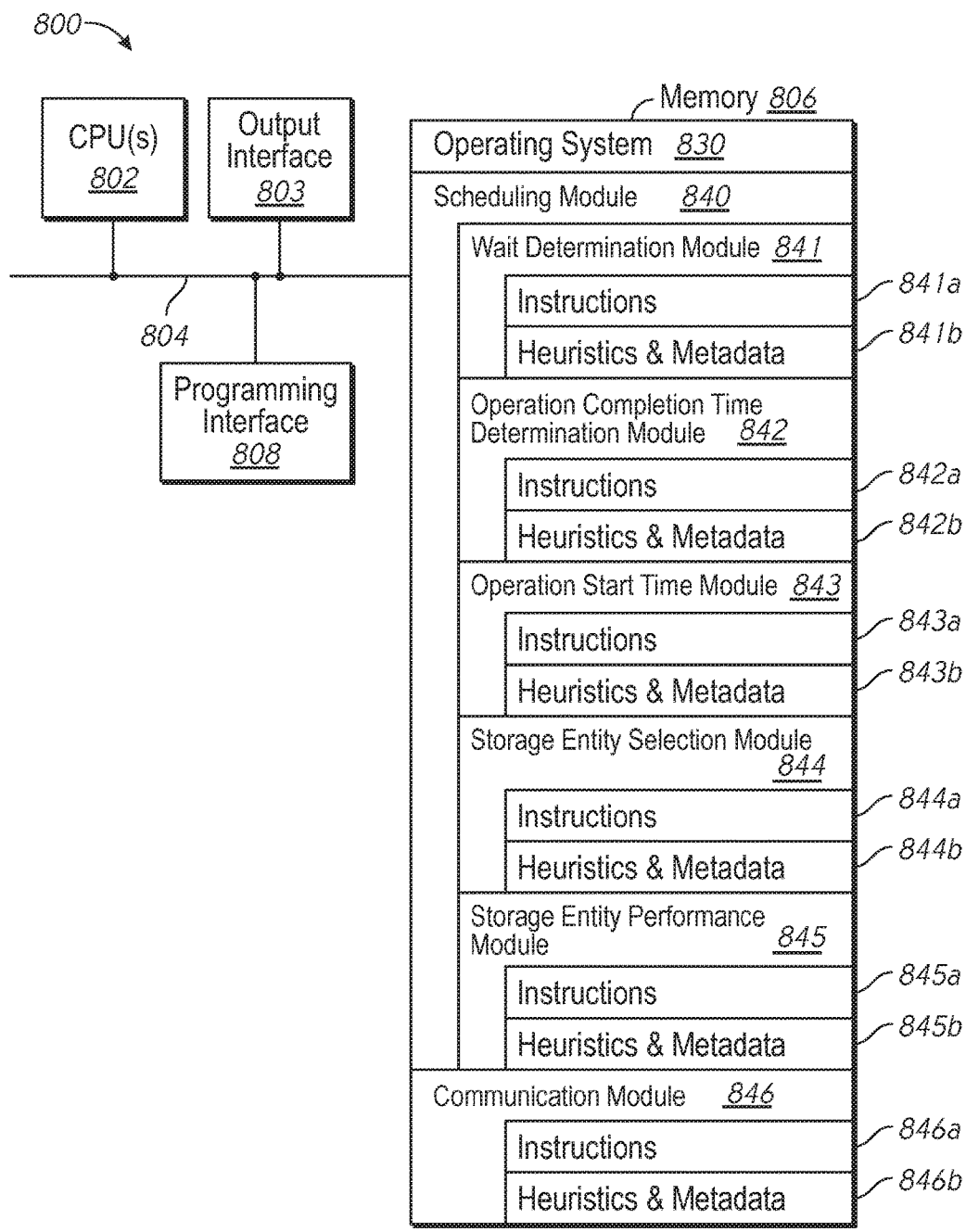
FIG. 8 is a block diagram of a computing device of an object-based storage system in accordance with some implementations.

FIG. 8 is a block diagram of a computing device 800 of an object-based storage system in accordance with some implementations. In some implementations, the computing device 800 corresponds to the latency reduction system 109 of FIG. 1B and performs one or more of the functionalities described above with respect to the latency reduction system 109. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803 (e.g., a network interface), a memory 806, a programming interface 808, and one or more communication buses 804 for interconnecting these and various other components.

In some implementations, the communication buses 804 include circuitry that interconnects and controls communications between system components. The memory 806 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some implementations, the memory 806 or the non-transitory computer readable storage medium of the memory 806 stores the following programs, modules and data structures, or a subset thereof including an optional operating system 830, a scheduling module 840 and a communication module 846. In some implementations, one or more instructions are included in a combination of logic and non-transitory memory. The operating system 830 includes procedures for handling various basic system services and for performing hardware dependent tasks. In some implementations, the scheduling module 840 is configured to schedule the start times of respective write operations associated with storage of a data segment. To that end, the scheduling module 840 includes a wait determination module 841, an operation completion time determination module 842, an operation start time module 843, a storage entity selection module 844, and a storage entity performance module 845.

In some implementations, the wait determination module 841 is configured to determine a wait time or period before performing a respective write operation at a respective storage entity. To that end, the wait determination module 841 includes a set of instructions 841a and heuristics and metadata 841b. In some implementations, the operation completion time determination module 842 is configured to determine how long a respective write operation will take to complete, and/or how much time remains in a respective write operation threshold for performing the write operation. To that end, the operation completion time determination module 842 includes a set of instructions 842a and heuristics and metadata 842b.

In some implementations, the operation start time module 843 is configured to determine the latest possible start time for performing a respective write operation, in order to complete the write operation within a predetermined write operation threshold. To that end, the operation start time module 843 includes a set of instructions 843a and heuristics and metadata 843b. In some implementations, the storage entity selection module 844 is configured to identify storage entities, for storage of content data and/or parity data associated with a data segment and scheduling request. To that end, the storage entity selection module 844 includes a set of instructions 844a and heuristics and metadata 844b. In some implementations, the storage entity performance module 845 is configured to manage one or more performance parameter values from one or more storage entities of an object-based storage system. To that end, the storage entity performance module 845 includes a set of instructions 845a and heuristics and metadata 845b.

In some implementations, the communication module 846 is configured to obtain and convey communications with other computing devices, such as ingest storage entities or storage entities, as described above with respect to FIG. 1B. In some implementations, these communications include, but are not limited to, receiving and/or transmitting scheduling requests, scheduling response messages, status requests and performance parameter values. In some embodiments, communication module 846 is configured to read and extract information from a scheduling request (e.g., received from an ingest storage entity), and/or create and generate a scheduling response message corresponding to the scheduling request (e.g., sent to an ingest storage entity). To that end, the communication module 846 includes a set of instructions 846a and heuristics and metadata 846b.

Although the communication module 846, wait determination module 841, operation completion time determination module 842, operation start time module 843, storage entity selection module 844, and storage entity performance module 845 are illustrated as residing on a single computing device 800, it should be understood that in other embodiments, any combination of the communication module 846, wait determination module 841, operation completion time determination module 842, operation start time module 843, storage entity selection module 844, and storage entity performance module 845 can reside in separate computing devices in various implementations. For example, in some implementations each of the communication module 846, wait determination module 841, operation completion time determination module 842, operation start time module 843, storage entity selection module 844, and storage entity performance module 845 reside on a separate computing device.

Moreover, FIG. 8 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
a latency reduction system configured to reduce latency in writing data to one or more storage entities that are each configured to store data on an object-basis, the latency reduction system including a non-transitory memory, one or more processors, and control links to each of the one or more storage entities:
receiving a scheduling request associated with a write operation;
determining a wait period for the write operation, wherein the wait period is less than or equal to the difference between a client-defined operation threshold and an operation completion time of the write operation; and
determining an operation start time for the write operation, based in part on the wait period.

2. The method of claim 1, further comprising:
determining the operation completion time for the write operation at a respective storage entity of the one or more storage entities.

3. The method of claim 1, wherein the scheduling request is received from an ingest storage entity of the one or more storage entities.

4. The method of claim 3, further comprising:
generating a scheduling response message corresponding to the scheduling request, wherein the scheduling response message includes the operation start time for the write operation; and
transmitting the scheduling response message to the ingest storage entity.

5. The method of claim 4, wherein the scheduling response message identifies a data-storing storage entity or a parity-storing storage entity corresponding to the write operation.

6. The method of claim 1, further comprising:
obtaining one or more performance parameter values from one or more respective storage entities of the one or more storage entities; and
determining the operation start time for the write operation, based in part on the obtained one or more performance parameter values.

7. The method of claim 1, further comprising:
selecting a data-storing storage entity from the one or more storage entities for writing content data corresponding to the write operation, when the write operation includes an instruction to write content data;
selecting a parity-storing storage entity from the one or more storage entities for writing parity data corresponding to the write operation, when the write operation includes an instruction to write parity data; and
determining the operation start time for the write operation, based in part on the selected data-storing or parity-storing storage entity.

8. The method of claim 1, wherein the scheduling request includes one or more of a data segment, a location for retrieving the data segment, a size of the data segment, a copy count of the data segment, the client-defined operation threshold and a data-to-parity ratio for storage and backup in the one or more storage entities.

9. A latency reduction system configured to reduce latency in writing data to one or more storage entities, further comprising:
one or more storage entities each configured to store data on an object-basis; and
a controller with control links to the one or more storage entities, comprising:
a communication module configured to receive a scheduling request associated with a write operation; and
a scheduling module configured to:
determine a wait period for the write operation, wherein the wait period is less than or equal to the difference between a client-defined operation threshold and an operation completion time of the write operation; and
determine an operation start time for the write operation, based in part on the wait period.

10. The latency reduction system of claim 9, wherein the scheduling module is further configured to determine the operation completion time for the write operation at a respective storage entity of the one or more storage entities.

11. The latency reduction system of claim 9, wherein the scheduling request is received from an ingest storage entity of the one or more storage entities.

12. The latency reduction system of claim 11, wherein the communication module is further configured to:
   generate a scheduling response message corresponding to the scheduling request, wherein the scheduling response message includes the operation start time for the write operation; and
   transmit the scheduling response message to the ingest storage entity.

13. The latency reduction system of claim 9, wherein the scheduling module is further configured to:
   obtain one or more performance parameter values from one or more respective storage entities of the one or more storage entities; and
   determine the operation start time for the write operation, based in part on the obtained one or more performance parameter values.

14. The latency reduction system of claim 9, wherein the scheduling module is further configured to:
   select a data-storing storage entity from the one or more storage entities for writing content data corresponding to the write operation, when the write operation includes an instruction to write content data;
   select a parity-storing storage entity from the one or more storage entities for writing parity data corresponding to the write operation, when the write operation includes an instruction to write parity data; and
   determine the operation start time for the write operation, based in part on the selected data-storing or parity-storing storage entity.

15. A latency reduction device configured to reduce latency in writing data to one or more storage entities each configured to store data on an object-basis, comprising:
   one or more processors;
   a non-transitory memory;
   one or more control links to the one or more storage entities;
   means for receiving a scheduling request associated with a write operation;
   means for determining a wait period for the write operation, wherein the wait period is less than or equal to the difference between a client-defined operation threshold and an operation completion time of the write operation; and
   means for determining an operation start time for the write operation, based in part on the wait period.

16. The latency reduction device of claim 15, further comprising:
   means for determining the operation completion time for the write operation at a respective storage entity of the one or more storage entities.

17. The latency reduction device of claim 15, wherein the scheduling request is received from an ingest storage entity of the one or more storage entities.

18. The latency reduction device of claim 17, further comprising:
   means for generating a scheduling response message corresponding to the scheduling request, wherein the scheduling response message includes the operation start time for the write operation; and
   means for transmitting the scheduling response message to the ingest storage entity.

19. The latency reduction device of claim 15, further comprising:
   means for obtaining one or more performance parameter values from one or more respective storage entities of the one or more storage entities; and
   means for determining the operation start time for the write operation, based in part on the obtained one or more performance parameter values.

20. The latency reduction device of claim 15, further comprising:
   means for selecting a data-storing storage entity from the one or more storage entities for writing content data corresponding to the write operation, when the write operation includes an instruction to write content data;
   means for selecting a parity-storing storage entity from the one or more storage entities for writing parity data corresponding to the write operation, when the write operation includes an instruction to write parity data; and
   means for determining the operation start time for the write operation, based in part on the selected data-storing or parity-storing storage entity.

* * * * *